United States Patent [19]
Rubow et al.

[11] Patent Number: 5,902,619
[45] Date of Patent: May 11, 1999

[54] METHOD AND APPARATUS FOR DISINFECTING OR STERILIZING FOODSTUFFS AND OTHER ARTICLES

[76] Inventors: Ulrik Rubow, Johannesmindevei 24; Thure Carnfeldt, Bakkeveaenget 7, both of Aalborg, Denmark

[21] Appl. No.: 08/849,071

[22] PCT Filed: Nov. 28, 1995

[86] PCT No.: PCT/DK95/00470

§ 371 Date: Jul. 1, 1997

§ 102(e) Date: Jul. 1, 1997

[87] PCT Pub. No.: WO96/16555

PCT Pub. Date: Jun. 6, 1996

[30] Foreign Application Priority Data

Dec. 2, 1994 [DK] Denmark .................................. 1377/94

[51] Int. Cl.[6] .................................. A23L 3/00; A61L 2/00

[52] U.S. Cl. .............................. 426/235; 99/536; 422/28; 426/521

[58] Field of Search ...................................... 426/235, 321, 426/521; 99/473, 536; 422/28

[56] References Cited

U.S. PATENT DOCUMENTS 3,819,329  6/1974  Kaestner et al. ........................ 426/235

*Primary Examiner*—George Yeung
*Attorney, Agent, or Firm*—Dennison, Meserole, Schener & Schultz

[57] ABSTRACT

A method and apparatus for disinfection or sterilizing an article which is a food or foodstuff, or a surface of an article for contacting a food or foodstuff. According to the invention, the article is grounded and is treated with an electrically charged mist of a liquid having a redox potential and a predetermined pH. The mist is subsequently evaporated from the article.

18 Claims, 7 Drawing Sheets

METHOD AND APPARATUS FOR DISINFECTING OR STERILIZING FOODSTUFFS AND OTHER ARTICLES

BACKGROUND OF THE INVENTION

This present invention is concerned with a method for disinfection and sterilization of foods and vegetable products and produce, feeding stuffs or machinery and equipment for food and/or feeding stuff production.

A similar method is known for U.S. Pat. No. 4,849,237.

This mentioned patent specification concerns a method for desinfection of chicken bodies kept immersed in cooling water with ozone added, which water is made to move or flow in the opposite direction of the chicken's movement. The disadvantage of that known method is that the cooling water acts as contaminator from one chicken to another, and further the process may cause mean and fat to deteriorate and go rancid.

This present invention is concerned with a method for desinfection and/or sterilization of foods of all kinds for use in any part of the food or foodstuff or feeding stuff industry, by organisations, corporations, companies and institutions in the food sector, and the method described has the purpose of preventing the risk of humans or animals being exposed to infection from micro organisms or their byproducts resulting in subsequent pathological diseases or reactions, poisonings and other illnesses. Authorities and health care organisations today often report the increasing need for methods to transport, treat, process, manufacture, pack, deliver and distribute food and feeding stuffs without dangerous, poisonous, infectuous, pathological and disease-causing effects.

Most infections of the nature described in the above start or are caused by growth of micro organisms on the surfaces of food products or produce or on the surfaces of other materials or equipment able to hold and carry micro organisms.

For many years it has been a common and acknowledged practice in the industries and companies mentioned in the above text to control raw materials and production with help from authority representatives and own experts by having samples taken at intervals and in quantities stipulated for each separate production, which samples are taken checked and analysed in official, recognised and/or own laboratories. Frequently controls concentrate on checks for salmonella bacteria, which occur in some 2,000 different known types, some of which cause severe cases of illness or poisonings in humans or animals after consumption.

The consequential effects of bacteria infection and the occurrence of pathological cases have increased considerably over the past few years, presumably because of shorter production times, large quantity manufacturing and mass production, automation and mechanised control and processing, at the same time as the craftsman's job and his control during the manufacturing process has been taken over by technical installations and sporadic or statistically determined controls.

One common procedure is to take out small sample items of the processed food or feeding stuff and submit these to a laboratory for testing. Here, microorganisms are cultivated on various substrates (nutritious media) and after 3 or 4 days growths of bacteria or micro organisms may be found. Next the decision has to be taken whether the growths have to be subjected to further special analysis, which can only be dealt with by large, specialised laboratories with adequate equipment, and the bacteria samples are therefore sent to such special laboratories causing added cost and time delays.

Food articles or feeding stuffs are sampled from manufacturing plants immediately after processing, or they are sent away for freezing, and therefore results of such testing is often only available several days later than dispatch due to industry requirements for quick processing and short warehouse periods.

A few types of Salmonella and other bacteria provoke serious cases of disease. Acute gastroeneritis would be caused by e.g. Salmonella Typhi Murium or Enteriditis. More serious cases are caused by bacteria such as Salmonella Paratyphi type A, B or C and also by Salmonella Dublini, which infections may be mortal. Salmonella Typhi especially is the cause of the infectuous typhoid disease which may cause death from poisoning or mass epidemics in humans under certain conditions.

It is a known fact that many such cases of infection are not reported to public authorities so that they do not appear in statistics, but in medical circles the assumption is that the number of diseases, poisonings or other cases may be counted in hundreds of thousands per year globally, and mortal cases are reported to be several thousands every year.

One recently registered patent, EP No: 0 299 601 (Al) indicates that the invention described may certify the occurrence of Salmonella infection within 24 hours, thus reducing the time needed for analysis and testing, but the method of the invention does not prevent or preclude any such infection.

The existence of micro organisms or bacteria in or on foods or feeding stuffs is dangerous to consumers since neither cooling nor freezing result in bactericidal processes, sterilization or desinfection. During transportation, delivery, commercial distribution and warehousing in cooled, refrigerated or frozen conditions the bacteria growth comes to a standstill, but subsequent use or application will enable the bacteria to cause renewed growth under favourable temperatures and conditions.

Salmonella bacteria are surface bacteria which will, if subjected to favourable temperatures in the surroundings and to nutrient substrates in the form of foods or feeding stuffs, multiply through duplication every 20 minutes, which means that the Salmonella bacteria count should be multiplied by a factor larger than $10^{21}$ for every 24 hours, enabling the the huge number of infectuous matter to spread easily in the processing environment through human hand, transportation, cutting, manufacture, processing and storage.

Traditionally, people in the profession have over time taken care to this risk in all concerned industries and services, and bacteria growth and the spreading of micro organisms have been prevented by cleaning and sanitation, but the precautions taken have not been sufficient to prevent infection and the occurrence of pathological events, especially gastroenteritis or stomach poisonings, and authorities, companies engaged in food processing or feeding stuff production, corporations, distributors and other manufacturing or servicing units have not been able to offer the public and the consumers sterilised products free of the risk of the infections indicated in the above.

SUMMARY OF THE INVENTION

The presence of salmonella bacteria and other bacteria are a natural phenomenon, and the types of bacteria indicated occur naturally in the intestinal tracts of animals. It is inevitable that butchering, slaughtering and processing lead to bacteria infection of other surfaces. Through the invention described here it is achieved that the existing spreading route open to bacteria is interrupted at the points of production where the method and the plant according to the method can be inserted or added to the production line in the slaughtering or processing of the products mentioned in the above.

The plant or embodiment of the invention used for the method in accordance with the invention comprises a control cabinet and a cabin, cubicle or other enclosure, equipped with the machinery and control technology under this present invention. Inside this enclosure or cabin, a mist with special germicidal and bactericidal properties, which mist at certain concentrations and dosages and periods of treatment will kill bacteria, micro organisms, and in some cases vira, whenever these germs of infection are brought into contact with the particles of the mist. The mist formed in the described enclosure is to have properties that ensure that the mist particles are made to contact and affect all accessible surfaces, as well as ensure that mist particles are bactericidal on the surfaces affected within a short span of time.

The invention is designed for use in all food, feeding stuff and/or food products or food produce related companies or institutions for the sterilization or desinfection of foods or feeding stuffs, e.g. meats, poultry, fish, vegetables, oilcakes, fishmeal, bonemeal, milk products etc.

In the process according to the invention the object under treatment is earthed or ground connected, and for a desired period the object is treated with a mist of treated water, which water is atomized or disintegrated under high pressure and with a redox potential that makes it either oxidising or reductive, and in a way that the mist is charged with an either positive or negative potential, and which further has a certain pH value. It desirable the object may be exposed to a supplementary magnetic, preferably pulsating field, whereupon the object will leave the process area in dry condition after evaporation of the mist.

By using the method in accordance with the invention a thin and homogenous film of liquid with oxidising properties is formed on the object to be treated. The treatment is so short and intensive that the life functions of the bacteria are attacked without influence on the surface of the object treated.

Some types of bacteria are polarised. Such forms will be rendered harmless by a pulsating magnetic field.

BRIEF DESCRIPTION OF THE DRAWINGS

The invention will be described in further detail under reference to the attached drawing, where.

9. Internal air compressor for the creation of operative pressure whenever necessary.
10. Magnetic valve for compressed air.
11. High pressure pump driven by compressed air, consisting of,

11*a*. Operating piston and pressurizer.

11*b*. Pressure tube taking mist-producing liquid to disintegrator/atomiser.

11*c*.Feeder pipe for disintegrator pump.

11*d*. Return pipe ensuring the presence of calibrated liquid.

12. High pressure liquid disintegrator/atomiser, e.g. using a nozzle principle, consisting of,

12*a*. Mist-formating disintegrator head with f.ex. nozzle(s) and electrically charged electrode(s) for charging electric potential in the aqueous liquid and the mist of vapour.

12*b*. Compressed air valve for start and stop of transportation of the resulting mist into the enclosed cabinet.

12*c*. Electric (high) tension for the electrically charged electrode (12*a*).

13. Electric relay for control, connection and disconnection of electric current (ON/OFF).
14. High tension electron generator.
15. Valve for activation of actuator apparatus (for immersion) 16.
16. Actuating device carrying control and measuring equipment, plus earthing or ground potential (36), consisting of,

16*a*. Cylinder with piston for actuation by compressed air.

16*b*. Piston rod mounted with panel carrying control and measurement equipment plus earthing potential or device for the removal of any high tension prior to measuring and regulation/calibration of redox potential.

16*c*. Travel distance of piston and panel.

17*a*–17*c*. Measuring equipment for the control of liquid surface level in redox tank 5.

17*a*. Valve e.g. a magnetic valve, for control of water/liquid intake.

17*b*. Level gauge.

17*c*. Liquid inlet tube with controlled ground/earthing connection or switch.

18. Object, food item or feeding stuff item, to be treated in accordance with the method of the invention, and which will pass through the disinfecting or sterilizing mist.

19. The mist or vapour crested, through which objects for treatment will pass. Contact with the particles of the mist will ensure disinfection or sterilization.

20. Tank provided with a valve (20*a*) for disinfectant media which do not in themselves have a redox potential, which media could be e.g. formic acid or ethanol.

21. Cabinet or enclosure for treatment of objects (18) in which the reactive properties of the mist (19) are used to affect bacteria or micro organisms. This cabinet may further be used as a drying section, affecting the surfaces with conditioned air which will enhance the siccative process on the surfaces in question.

22. Generator designed for the creation of a pulsating magnetic field.

23. Inlet for conditioned air for the surface treatment of objects (18).

24. Control cabinet.

29. Intake for external compressed air if needed.

30. Electric or pneumatic recirculation pump consisting of,

30*a*. Pump propellant, engine/motor.

30*b*. Pump casing.

30*c*. Operating shaft for pump set in insulating material.

30*d*. Suction socket for pump.

30*e*. Insulating air buffer distance to mist-creating liquid.

31. Liquid disintegrator or atomiser consisting of,

31*a*. Spiral-shaped vaporizing chamber for transportation of liquid/air mixture of a diameter of 10 to 25 mm and with a length of up to 30 mm, dimensioned according to the capacities of the plant.

31*b*. Outlet from the liquid/air mixture tube into the mist-creating liquid.

31*c*. Rising bubbles of air not disintegrated into the liquid.

32. Air injection nozzle, venturi tube for mixing air with liquid.

33. Level of liquid, liquid container level.

34. Pump from for transportation of air from disintegrator device (7*a*) to inlet pipe (7*b*).

36. Earthing or grounding for the entire plant.

DESCRIPTION OF THE PREFERRED EMBODIMENTS

The plant according to the invention functions in the following fashion;

The plant is supplied with raw water which is led to deionization, 2, to the extent necessary to supply the process with clean water free of germs, infectuous particles or undesired particles which might affect foods or feeding stuffs in respect of taste, flavour, odour, appearance, or shelf-life. For this purpose the invention utilises a known technique applied to the treatment of drinking water or process water. The water is taken forward to a membrane filtering section 3, which will remove molecules, infectuous particles or undisirable particles that are not supposed to come into contact with the objects, 18, which are articles of food that are actually intended to be cleaned of infectuous particles in the form of micro organisms or bacteria.

One possible process for use in this connection may be a known technique called "reverse osmosis" whereby a liquid substance is dissolved into small molecules of liquid mixed with small molecules of other matter, plus a smaller amount of liquid, a so-called percolate, containing larger molecules, micro organisms and undesirable particles, which percolate is led to outlet 3*b*.

The water thus treated is then led to a high-pressure storage tank, 4, from where it is through a valve arrangement led to tank 5, in which the treated water is provided with oxidising or reductive properties able to prevent or preclude the existence of foreign/undesired particles on the surface of the objects, 18, if the mist formed at a later stage in the process has been in touch with the surfaces of these objects.

From the redox potential generator, 7, ozonated air or otherwise enriched air with the properties desired is led to the water inside the container tank 5 by means of a pump 34, through the tube 7*b*, and by means of the pump 30*b* the water inside the tank is recirculated through an air injector 32, during which process the venturi principle will cause the air to disintegrate into the liquid, which liquid at the same time builds up a redox potential in the actual liquid through the movement of current in the mixture chamber 31*a*. Round the outlet 31*b* a circulation is created inside the tank 5, through which process the liquid achieves a redox potential which may be controlled via measuring instruments 6*b* and 17*b*.

A redox potential may be created in several ways, e.g. by mixing into a watery liquid a small amount of hydrogen peroxide, and the generator 8 is used to reinforce or reverse the process which is established through a redox potential generating apparatus, which apparatus will produce ozone with the effects desired.

Other methods for the creation of the redox potential desired may also be utilised to the extent the user may desire, one such possibility involving the use of chlorine gas, or hypochlorite, which substances may be added recreated in a suitable generator on an electrolytic basis.

Figure 1:
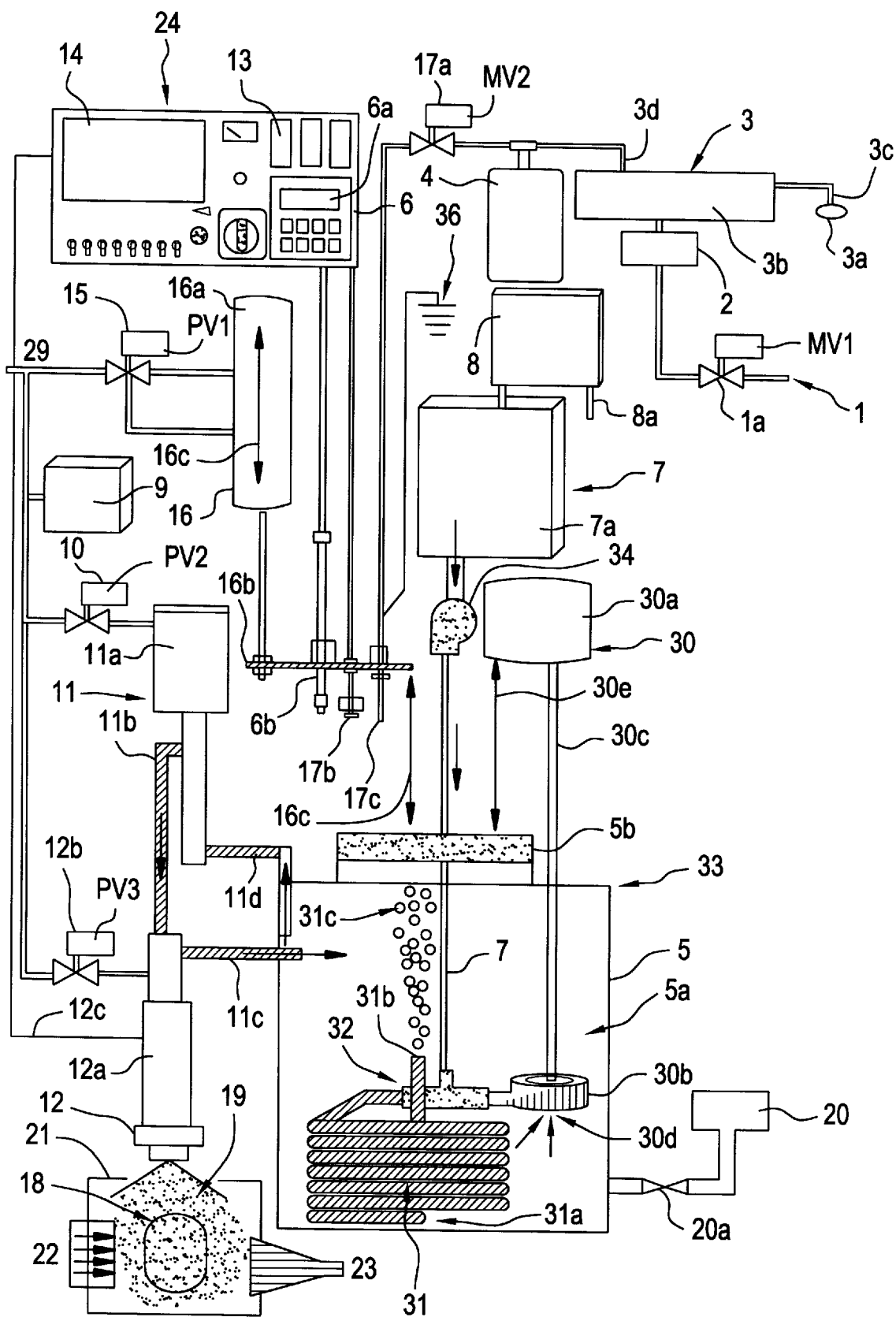
FIG. 1 shows a diagramme of a plant designed to carry out the process according to the method of the invention.
Figure 2:
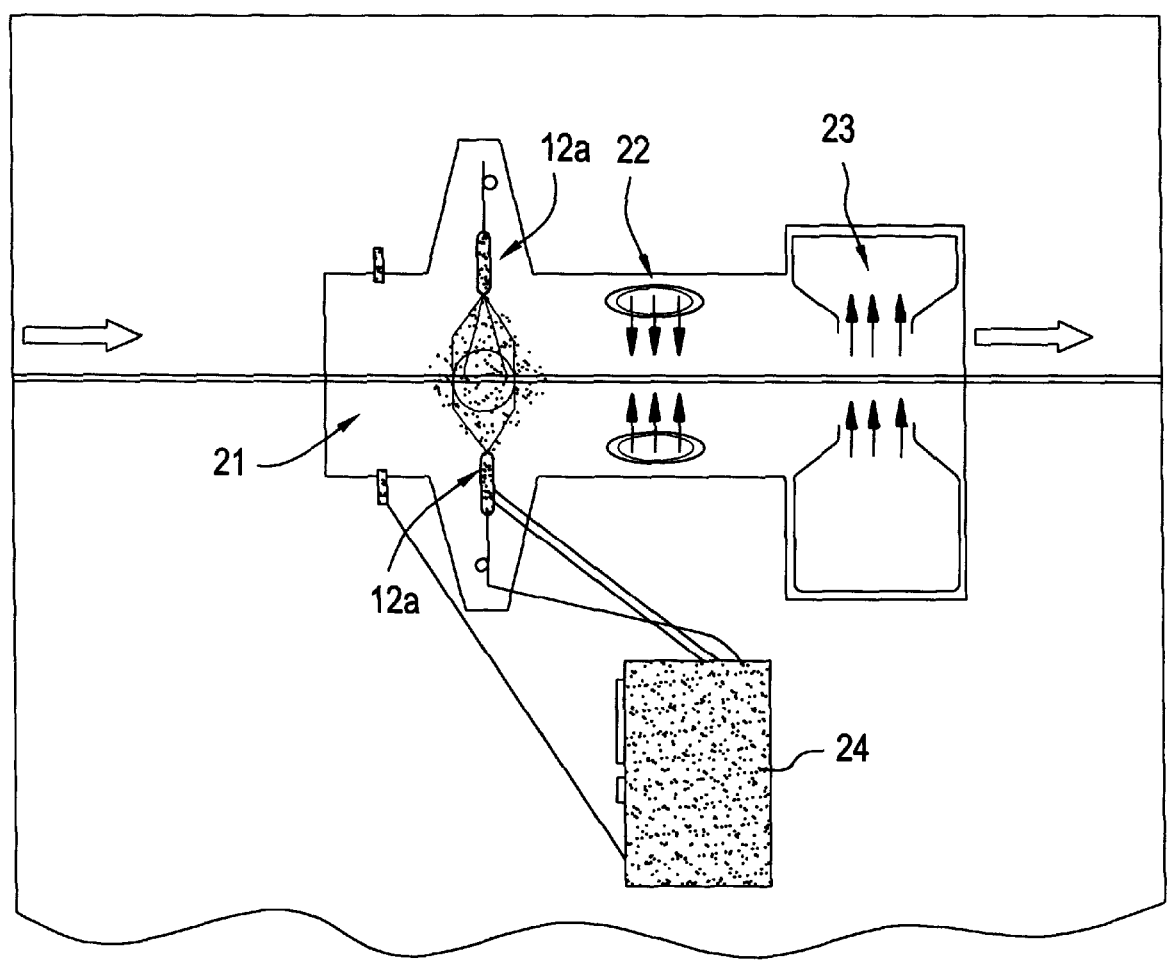
FIG. 2 is a schematic top view of a plant for the implementation of the process according to the method of the invention.
Figure 3:
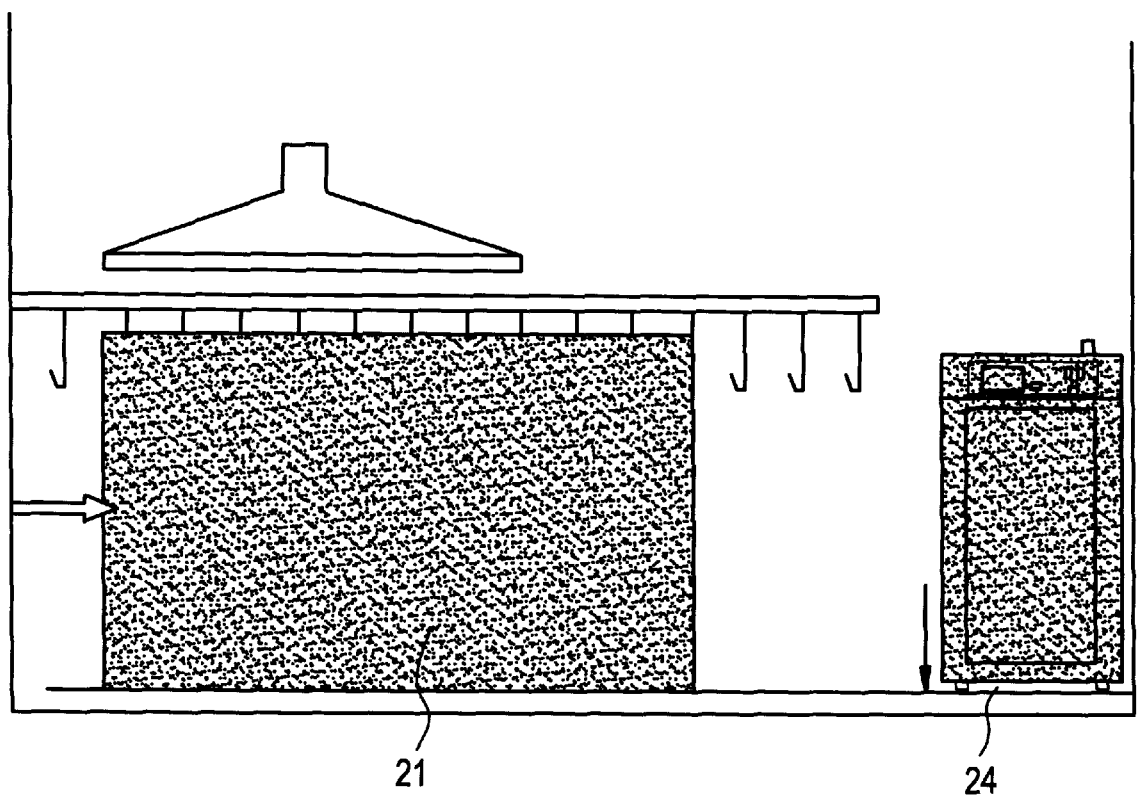
FIG. 3 shows a schematic side view of such a plant designed to carry out the method of the invention.
Figure 4:
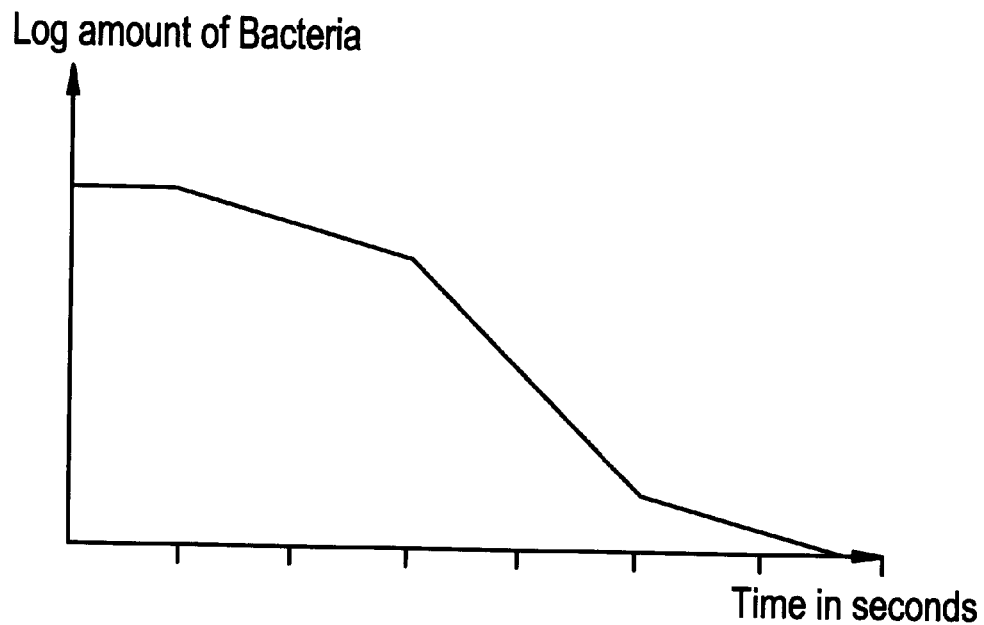
FIG. 4 depicts an experimental graph of the average number of bacteria killed as achieved in the process according to the method of the invention, measured over a time horizon of up to 70 seconds.
Figure 5:
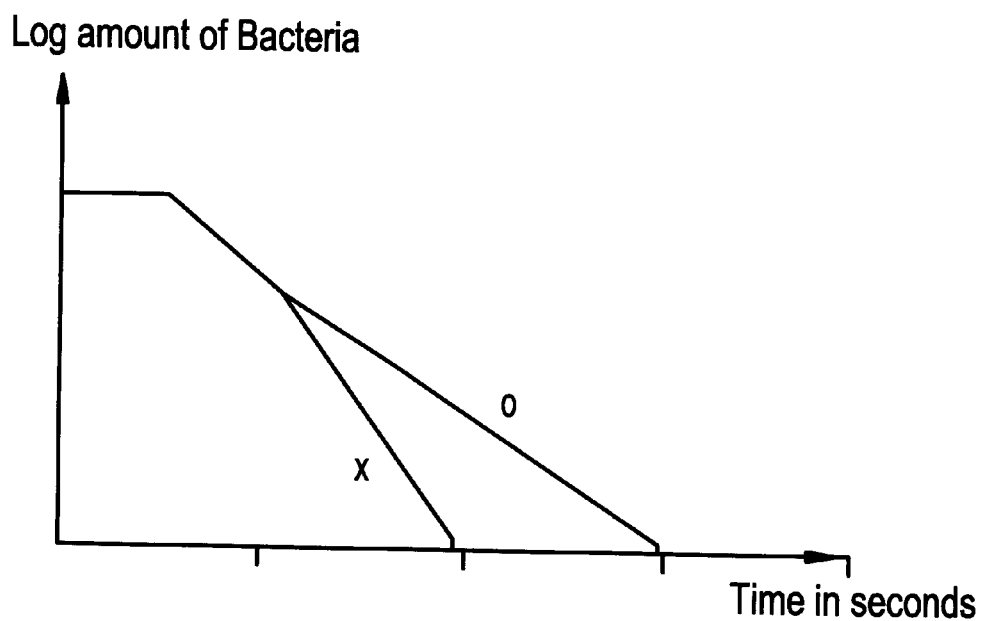
FIG. 5 shows, on a time horizon of max. 120 sec. an experimental graph of the average number of bacteria killed when using the invention, one graph showing results from the use of tap water (O), another showing results from the use of desalted, absolutely pure water (X)
Figure 6:
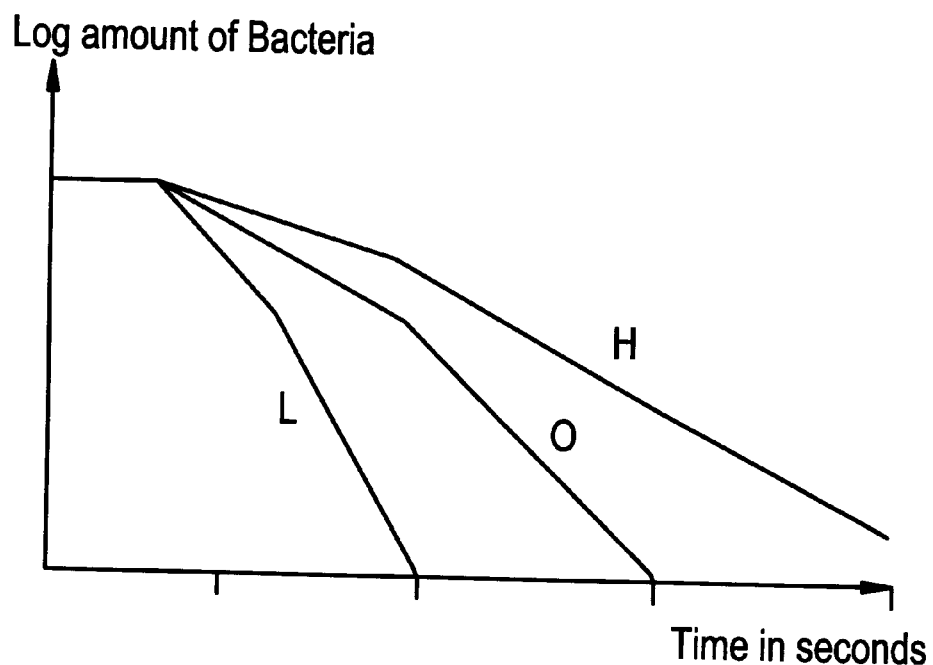
FIG. 6 shows three graphs of an experiment, measured over a time horizon of 100 seconds, of the average amount of bacteria killed when using the method of the invention with different pressurization of the water which forms the mist, (H=160 bar, L=20 bar)
Figure 7:
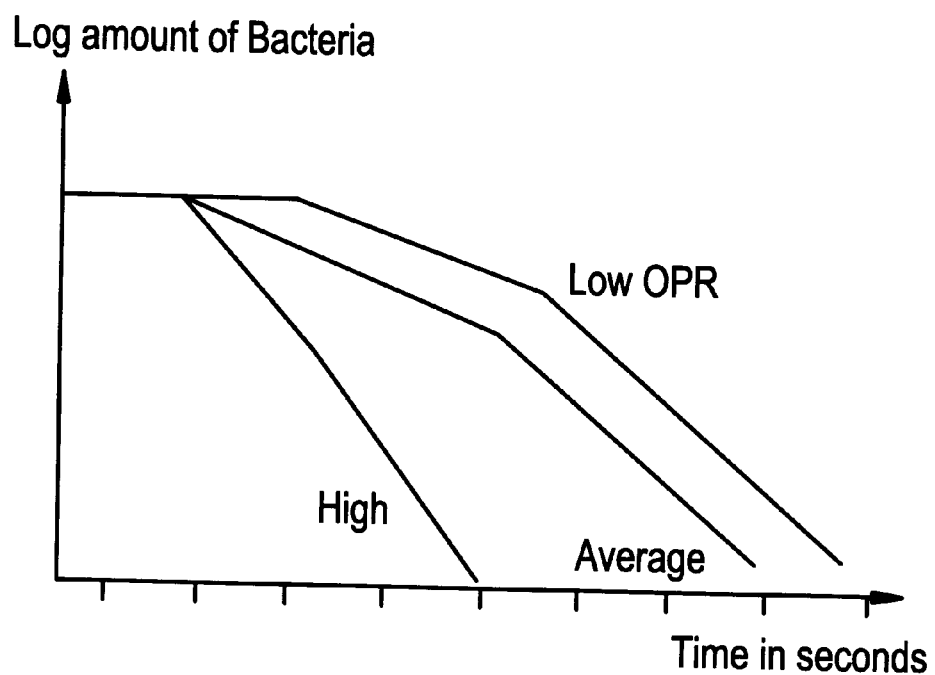
FIG. 7 shows three graphs from an experiment, measured over a time horizon of 180 seconds, of the average number of bacteria killed when using various redox potential in connection with the method of the invention.

The compressor 9 produces compressed air for the operation of the compressed air functions of the plant, especially the operation of the plant's air piston (the actuator) 16, the high pressure pump 11, and start and stop of the mist 19. In certain cases the pump 30 could also be driven by a high-pressure motor. The high pressure pump 11 puts the oxidising, if possible also reductive (redox potential equipped) liquid under high pressure, e.g. 160 bar, which will enable the mist-creating disintegrator 12*a* to create even very small particles of liquid, which particles before transportation are charged electrically to be either negatively or positively charged, through which action the thus formed particles may be kept floating or levitating in a mist-like condition for a long time, and through their electric charge can be brought into touch with the object 18, which object is earthed or grounded. The mist particles thus formed will, together with the electric charge, ensure that all portions of the surface of the object 18 are, provided a suitable duration of the process is allowed, brought into contact with the particles of the mist, so that all bacteria and micro organisms are destroyed in the bactericidal process.

The mist is charged in order to achieve a positive or negative potential to suit the characteristics of the form and surfaces of the objects 18, and satisfactory effects and results have been registered at charges of up to 200,000 Volts or even more.

The valve 15 controls the actuator 16 which again moves the panel 16*b* up or down in such a fashion that the functional units mounted on the panel only function or operate when the actuator 16 has submerged the panel with the mounted units in the liquid inside the cabinet or container 5, whereby the whole paint is charged with an electrical potential of 0 volts by means of a grounding or earthing device 36.

The mist 19 is transported away from the dinsintegrator unit 12*a* with or without compressed air. The mist is thus provided with a velocity which will keep the enclosure or cabinet for treatment of objects 18 supplied with a constant density of mist in order to ensure a homogenous surface treatment of heterogenous or uneven objects.

The tank 20 is used if desirable to reinforce the effect of the redox potential creating substances such as ozone from 7 and/or hydrogen peroxide from 8, since these chemical substances have a known, recognised and considerable disinfective effect.

The objects to be treated may have different forms, shapes and surface structures, and the plant according to the invention comprises a cabinet or enclosure 21 through which the objects 18 pass in such a way that they stay within the enclosure in a specified reactive period in order that the mist particles may exert their influence on the bacteria or micro organisms. The surfaces treated may dry more quickly and the siccative 5 process be enhanced by applying conditioned air (23).

A magnetic field, especially a pulsating one, has the special effect on polarised bacteria of being destructive or bactericidal under certain conditions or circumstances, and in the case of polarised micro organisms it would be advisable and expedient to supplement the steps mentioned in the above in order to ensure maximum effect within a short span of time. The strength of the magnetic field is to be between 200 and 900 Tesla, and the frequency 1–800 kHz.

The present invention has been thoroughly tested by means of a pilot plant containing all of the components mentioned in the above text. Sample items of food articles have undergone a treatment during which periods/time horizons, intensities, dosages, mist formations, electric charges, air pressure, pump pressure, velocities, speeds, and other parameters or variables have been changed, altered or modified, whereupon results have been assessed and evaluated through microscopic examinations as well as laboratory tests which in combination have been able to form a picture of the reliability of the method and of the effectiveness and efficiency under various conditions.

Preliminary and simultaneous studies and research have included biological and biochemical fields in order that a wide spectrum of use and efficiency of the invention could be expected and relied upon. The research seems to indicate that bacteria cells which have an internal pressure of reportedly 5 to 25 bar are destroyed when exposed to redox potentials of varying strengths or densities, and that the effect occurs in a very short span of time measured in seconds when using suitable redox potential strengths in excess of approx. 400 mV and up to the reportedly theoretical maximum potentials of between 1000 and 2000 mV. It is assumed that the so-called "potassium-sodium pump" in the cellular membrane is destroyed. However, a scientific proof of this process has not yet been found.

The relationship between bactericidal processes and redox potential has been researched in tests made under a microscope, and it appears that a falling or reduced redox potential results in extended duration of processes corresponding to an increase of absciss values compared with ordinate values in the bactericidal graphs for certain bacteria, Typhi Murium and Interdis Dublin, resulting in the fact that the bactericidal curve or graph approaches an asymptotic or horizontal course, i.e. that the bacteria count does not change with the period of observation if the redox potential approaches some 400 mV. The destructive bactericidal period measured at identical redox potentials varies a little for different species of bacteria but remains within similar values. The time needed for destruction according to said tests increases by a growing factor value at falling redox potential. On the other hand, the destruction time measured in seconds falls when redox potentials of more than 680 mV are used, and the graph gets to be very steep at approximately 1000 mV, which value is a suitable and expedient value for such treatment since the power consumption, the corrosion of construction materials and of the protective measures and devices will increase, resulting in raised production costs.

FIGS. 4 to 11 show a number of test result graphs where the log amount of bacteria killed is shown in proportion to treatment time in seconds.

FIG. 4 shows the average log amount of bacteria killed in which can be achieved when using the method of the invention, measured over a time horizon of 70 seconds.

FIG. 5 shows two test graphs where one graph, marked "x" shows the result achieved if tap water is used. Another graph, marked "o", shows the course of events is absolutely pure, desalinated water is used. It is evident that the treatment time falls if pure water is used in the process.

In FIG. 6 three test graphs are shown in such fashion that one, marked "H", shows the result of using a pressure of 160 bar. Another graph marked "O" shows the events when a pressure of 90 bar is used. The third graph, marked "L", indicates the results achieved if a pressure of 20 bar is used. This clearly demonstrates that the treatment time grows with increased pressure.

FIG. 7 shows three test graphs in which the graph marked "high" shows the results of giving the treatment vehicle a redox potential of 950 mV, and in which the graph marked "average" shows the evens when using a treatment vehicle with a redox potential of 750 mV, and where the graph marked "low ORP" shows the result of using a treatment vehicle with a redox potential of 610 mV. It is evident that the treatment time falls with increasing redox potential.

Figure 8:
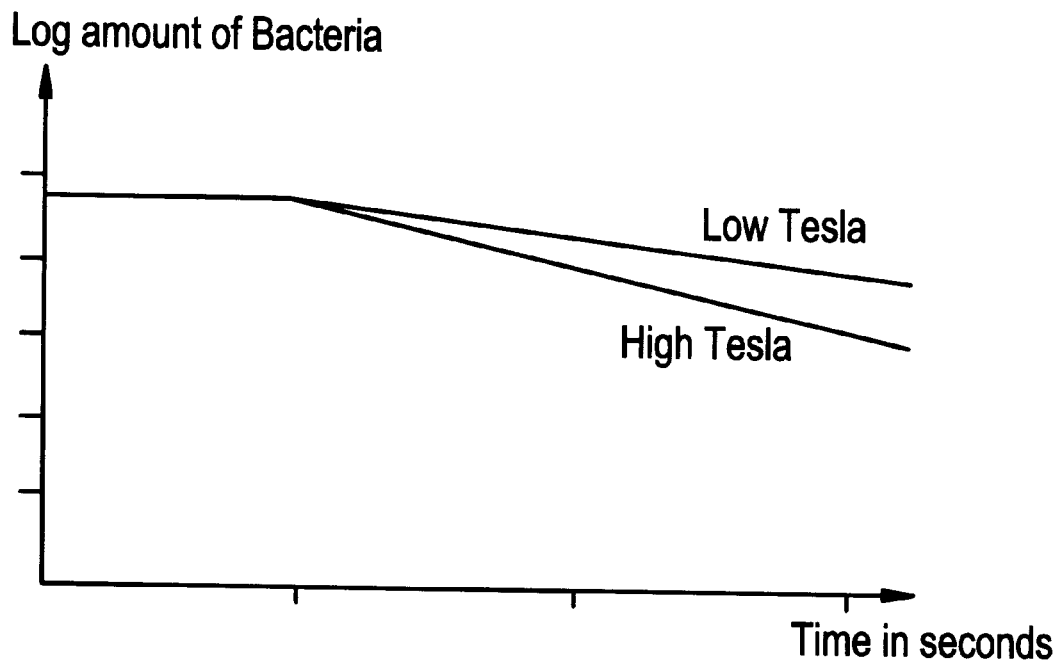
FIG. 8 shows graphs from two experiments, measured over a time horizon of 240 seconds, indicating the average count of bacteria killed if using exclusively a pulsating magnetic field according to the method of the invention and at different strengths of magnetic field.

FIG. 8 shows two graphs marked respectively "low Tesla" and "high Tesla". These results are from a test only using a pulsating magnetic field, and from the figure it is clear that the effect is higher when using "high" than when using "low" Tesla.

Figure 9:
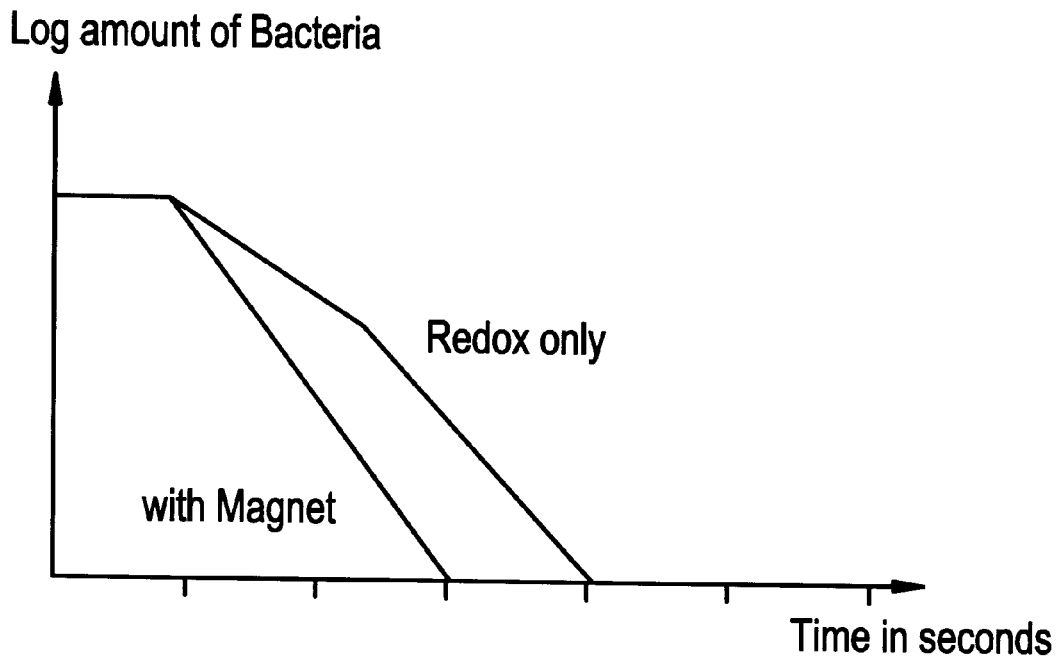
FIG. 9 shows graphs from two experiments measured over a period of up to 120 seconds indicating the average number of bacteria killed when using the method of the invention having the object affected by a water mist with a given redox potential alone, or alternatively with a water mist with redox potential and a magnetic field.

FIG. 9 shows two graphs marked "redox only" and "with magnet", which graphs respectively show the course of events achieved when only a treatment vehicle is used, and when treatment vehicle plus a magnetic field is being used. As it will appear from the figure the treatment time is reduced if a supplementary magnetic field is used.

Figure 10:
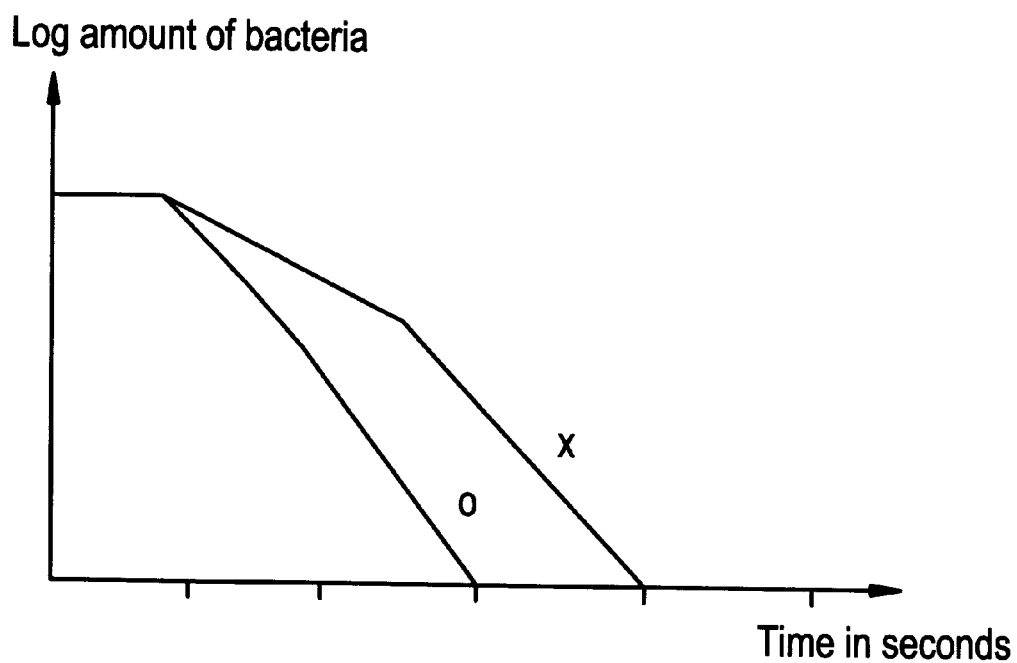
FIG. 10 shows two experimental graphs at the same redox potential measured over a time horizon of up to 250 seconds indicating the average amount of killed bacteria achieved when using the method of the invention if the redox potential is built up through the use of Ozone (O) or Hydrogen Peroxide (X)

FIG. 10 shows two graphs, marked "o" and "x", which graphs respectively show the results when the treatment vehicle is provided with ozone giving a redox potential of 550 mV, or when hydrogen peroxide (x) with a similar redox potential is used. The figure demonstrate that the best effect is achieved when ozone is used.

Figure 11:
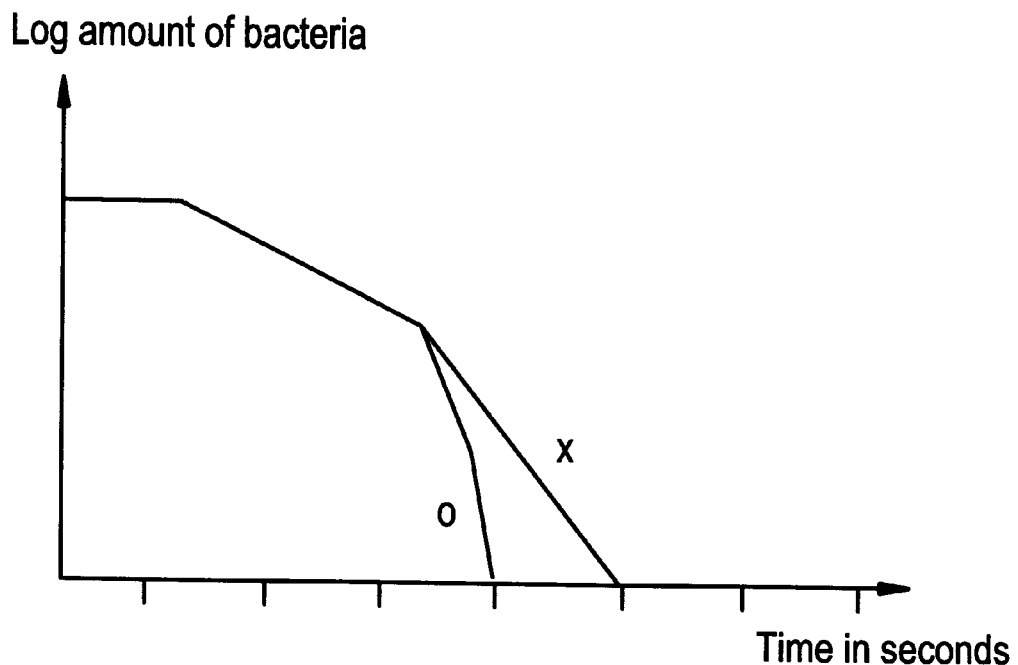
FIG. 11 shows two experimental graphs of the average number of bacteria killed, achieved by using the method of the invention, if the redox potential is kept unchanged (O) while increasing the pressure of the aqueous mist (X), As shown in FIG. 1–3 one embodiment of a plant designed to implement the method of the invention may consist of the following components, 1. Water inlet
1a. A valve, preferably a magnetic valve, the normal water supply in the local area.
2. Deionisation unit, where such is advisable for turning the inlet water into a pure, clean and suitable water quality,
3. Separator/separating unit with a pump, consisting of
3a. Membrane for the rejection of molecules of a certain size, bacteria, impurities, infectuous germs and other undesirable particles, using osmosis or other adequate purifying technology.
3b. Buffer tank for percolate leading to
3c. Pipe for treated water intake,
3d. Pipe for percolate.
4. Storage and buffer tank for treated water.
5. Tank for water with redox potential, i.e. oxidising or reductive qualities, consisting of,
5a. Watertight tank compartment.
5b. Aqueous liquid with redox potential for mist formation.
6. Redox meter, so-called ORP meter, for control and measuring oxidisation or reductive strengths in the aqueous and mist-producing liquid used, consisting of,
6a. Redox potential meter showing e.g. mV,
6b. Meter electrode in (precious) metal, f.ex. in platinum or gold, sending impulses to meter described in 6a., immersed in the mist-producing liquid for the period of measurement and with measurement positioning established by control units 16a, and 16b.
7. Redox potential generator, e.g. an ozone generating apparatus, either by light exposure or by electric discharge into air or oxygen, consisting of,
7a. Air treatment unit with pump (34).
7b. Inlet pipe for air with oxidising or reductive properties.
8. Other redox potential generators or mixing apparatus such as mixer units for hydrogen peroxide.
8a. Outlet valve.

FIG. 11 shows two graphs, marked "o" and "x", in which the"o" graph shows the line of events if average pressure is applied to the mist/vehicle 19. The "X" graph shows the course of events if high pressure is used.

In the following section, a number of experiments made will be described:

EXAMPLE 1

One experiment with disinfection/sterilization was made with 10 specimens of pork meat which has been infected with the Salmonella species Pomona in the laboratory of a large Danish meat processing plant. Immediately upon infection the specimens were fetched and brought direct to the pilot plant, where the specimens were treated after being kept at 21 Centigrade for four hours. The intention was to treat the pork specimens with identical doses on all ten specimens in order to see if effective treatment could be expected for homogenous objects. The conveyor which took each single specimen individually through the mist 19 moved at a speed of approx. 0.5 m/sec., and the temperature was kept at 21 Centigrades. The testing conditions were designed to yield approx. +600 mV redox potential, established by adding ozone to the aquaous vehicle which formed the mist. After treatment the pork specimens were packed in sterile plastic bags which were sealed in a sterile fashion and subsequently transported at 21 Centigrades to the same laboratory. On arrival they started the standard procedure for control of Salmonella infection, and after 4 days results were reported indicating that there had been found no traces of Salmonella infection. The specimens used were of a weight of 25 grammes which is the size of specimen most often used, and the specimens were cut from representative varieties of regular pork quantities leaving cut edges after the taking of specimens. A similar experiment with hydrogen peroxide as the redox potential generating ingredient has been carried out with analogous results.

EXAMPLE 2

An experiment has made using 2 specimens of pork liver and 2 chickens, bought in a well-reputed retail store. One of each type of specimen was infected with Salmonella Dubin bacteria taken from a live substrate form the Copenhagen Royal Veterinary and Agricultural College, and all four specimens were treated by passage through the cabinet of the pilot plant with the mist 19. The conveyor speed was at 0.5 m/sec., and an interval of 60 seconds passed between each treatment. Each specimen was passed through the mist 19 a second time after a rotation of 180 degrees in order to ensure that the large specimens had been uniformly formly treated on all surfaces. After 60 seconds waiting time after the second treatment the specimens were exposed to 60 C. hot air for a period of 60 seconds. This testing procedure had the purpose of checking partly the effect of a certain length of the treatment time, partly to finish the treatment within a certain time interval, in the way that the specimens were dissicated so as to achieve a dry surface without the existence of remains of the active ingredients, which active ingredients are only available in the aquaous vehicle forming the mist. Subsequent to treatment with hot air the specimens were packed in sterile plastic bags which were taken to the official Aalborg Veterinary laboratory where the 4 specimens were properly tested for Salmonella infection. After 4 days the laboratory issued a report showing that 1 chicken showed traces of salmonella infection. The chicken affected had not according to its coding been infected with Salmonella at the laboratory prior to the experiment. The report showed no salmonella infection in the other 3 specimens. During the treatment in the cabinet an aquaous vehicle forming the mist was used with small amounts of ozone added, thus generating a redox potential of of approx. 600 mV as measured by the mV meter installed in the cabinet.

This above experiment was planned and carried out with the purpose of establishing sufficient and necessary treatment times or periods and ditto intensities of the exposure inside the pilot plant in accordance with the invention for known and specified species of bacteria as well as unspecified bacteria naturally occurring in nature. The parameters used were chosen or selected in such a way that expected total bactericide counts would be achievable for comparison with the bactericide graphs resulting from the general testing process shown in the graphs in FIGS. 4 to 7.

The mentioned parameters were selected in such a way that a distinction would appear between known species of bacteria and any possible occurrence of species which might have a stronger resistence to the chosen intensity of treatment. In this way it could be established that the final treatment parameters are to be determined with much larger accuracy, depending on the strains or stock of bacteria present.

EXAMPLE 3

An experiment with heavily infected specimens of difficult configuration was made with 5 whole chickens, all taken from a current line of production and submerged in a liquid meat soup filled with Salmonella bacteria, then kept for 24 hours at approx. 30 C. and then—in the case of the 4 chickens—treated. In the experiment a mist 19 with a redox potential of 500 mV was used for 2 chickens, and a mist 19 with a redox potential of approx. 620 mV was applied. One chicken from each experimental group passed the mist 19 twice, the second time after a rotation of 180 degrees. All 4 treated chickens were specially exposed to mist 19 inside the carcasses since it could be foreseen that the mist 19 could not spread into the concave space with such a small aperture. The four treated chickens and the fifth untreated chicken were taken to an official veterinary laboratory for analysis and control of Salmonella infection. All specimens showed signs of infection, however chicken No. 3 showed only a low level of infection, and this chicken No. 3 had been treated with mist 19 measured to have a redox potential of 620 mV, and had been treated twice with a rotation of 180 degrees between the two treatments.

The experiments carried out have had the purpose of proving the consistency of the effectiveness of the invention and at the same time demonstrate that there are certain limits to the physical properties of the mist 19, and to the course of the treatment and the character of the objects for treatment. Another range of experiments has been carried out with the purpose of establishing and determining a redox potential measuring process expressed in mV inside the aquaous vehicle or liquid that forms the mist. The invention described herein comprises components which are to ensure a consistent and constant value or effectiveness of the properties contained in the aquaous vehicle that forms the mist. The choice of redox potential generating ingredients can be crucial to the importance of use of this invention, and experiments have shown that ozone has a faster effect than the use of hydrogen peroxide, chlorine gas, hypochlorous acid, hypochlorite ions in alkaline solutions, and chloramine.

The bactericidal effect is about 25 times faster for ozone than for hypochlorous acid and some 2500 times faster than for hypochlorite ions in alkaline solutions. The same relationship also applies in relation to treatment for vira, spores and amoebae.

The intentions behind this experiment were to show that a very progressed bacteria infection under circumstances which do not naturally arise or occur in food processing plants would demand a relatively high treatment intensity in order to be effective and efficient. The choice was to experimentally treat chickens that had been extraordinarily heavily infected and had been kept aside for bacteria development for many hours (>24 h). In this way it could be established that the method of treatment in accordance with the invention could be designed to suit existing conditions in such fashion that practical treatment can become sufficient and necessary. In order to determine the favourable parameters for treatment it will be necessary to check into the limits for total bactericidal effect, which again depends on availability of experiments made for both high and low figures, intervals or values.

EXAMPLE 4

A range of experiments were made under microscope with various strains of bacteria, and the above mentioned figures for the bactericidal processes and elimination times and tests with yeast cells have been confirmed at approx. 10,000 × magnification.

EXAMPLE 5

A range of experiments were carried out in order to find the concentration of ozone in water since ozone dissolves more willingly in water (approx. 12.5 times higher solubility) than oxygen which is the elementary ingredient in ozone, however with a lower redox potential. Ozone, however, deteriorates into an oxygen state in the course of a short period, depending on among other things temperature and humidity or moisture. Thus, an ozone amount of 0.072 g/h resulted in a concentration of 421 ppm after 2 days in 40 liters of water with a redox potential of 420 mV. This experiment showed that the ozone quantity must be available and present in a higher concentration in order to generate in the liquid the redox potential which will give the desired quick effect. The method of the experiment was use to establish expedient capacities of an ozone generator. Besides, this range of experiments had the expected result that the ozone concentration in the ozonated gas was proportional to the achievable solution of ozone in the aquaous liquid that forms the mist. Another result of the range of experiments was also to be expected, i.e. that the solubility of ozone falls with rising temperature, and with an ozone concentration in the gaseous phase of 24 mg/m3 a concentration in the liquid phase of approx. 8 mg/l at 20 degrees C. under constant possibilities for solution is achieved.

The choice of redox potential generating ingredients is of very great importance for the industrial utilization of the invention, since it is essential when treating foods and feeding stuffs that these will not be imparted with taste, flavour, smells or similar which could change the natural state of the objects. The ingredients used in accordance with the invention can be graduated in such a way that the aquaous phase of the mist 19 carries the active particles or elements, and after the aquaous phase has evaporated any conceivable effect and aftereffect has completely ceased.

Parts of the parallel laboratory tests have shown that the aquaous liquid or medium 5*c* affects live cells more quickly than it does dead cells if one chooses a necessary and sufficient level of treatment, which fact is of importance to the industrial use of the invention. The invention has not sought to illustrate the character of the difference between live and dead cells.

The plant of the invention here illustrated and described is only meant to serve as one example or embodiment of a plant designed to handle the process of the method in accordance with the invention.

What is claimed is:

1. A method for disinfecting or sterilizing an article comprising a food or foodstuff, or a surface of an article for contacting a food or foodstuff, comprising the steps of:

electrically grounding the article;

obtaining a sterilizing liquid having a redox potential which makes the liquid an oxidizing agent or reducing agent and a predetermined pH;

disintegrating or atomizing the sterilizing liquid under pressure to form a mist and imparting to the mist an electrical potential;

exposing the grounded article to the mist causing a thin homogeneous film of liquid to form on a surface of the article, thereby sterilizing or disinfecting the surface; and removing the mist from the article.

2. The method in accordance with claim 1, wherein the liquid comprises deionized water.

3. The method in accordance with claim 1, wherein the liquid is passed through a reverse osmosis membrane in the obtaining step.

4. The method in accordance with claim 1, wherein the liquid is disintegrated under a pressure of 20 to 160 bar.

5. The method in accordance with claim 1, wherein the liquid has a redox potential between 400 mV and 2000 mV.

6. The method in accordance with claim 5, wherein the liquid has a redox potential of 1000 mV to 2000 mV and has a pH value of <6.5

7. The method in accordance with claim 1, wherein the liquid is charged to have static electric tension of 20 KV to 200 KV depending on the size and shape of the article.

8. The method in accordance with claim 1, additionally comprising exposing the grounded article to a magnetic field destructive to polarized micro organisms during said exposing to the mist.

9. The method in accordance with claim 8, wherein the magnetic field is pulsating.

10. The method in accordance with claim 9, wherein the magnetic field has a strength of between 200 Tesla and 900 Tesla and a frequency in the range of 1–800 kHz.

11. The method in accordance with claim 1, wherein the redox potential is generated or created by controlled dissolution of ozone into the liquid.

12. The method in accordance with claim 1, wherein the redox potential is generated or created by controlled dissolution into the liquid of an agent selected from the group consisting of hydrogen peroxide, chlorine gas, hypochlorous acid, hypochlorite ions in alkaline solutions or liquids, chloramine and mixtures thereof.

13. The method in accordance with claim 7, wherein both the redox potential and the static electrical tension are accumulated in the liquid during the formation of the mist and the liquid is freed of electrical charge by grounding prior to measuring redox potential and static electric tension parameters of the mist-forming liquid.

14. An apparatus for disinfecting or sterilizing an article comprising a food or foodstuff, or a surface of an article for contacting a food or foodstuff, comprising:

means for deionizing water;

a reverse osmosis membrane unit arranged for treating the deionized water;

means for generating or storing a sterilizing or disinfecting material having a redox potential;

means for mixing the material having a redox potential with the water treated in the reverse osmosis membrane unit;

a high pressure liquid disintegrator for creating a mist and comprising a charged electrode for charging the mist;

a high pressure pump for delivering the water mixed with the material having a redox potential to the high pressure liquid disintegrator;

an enclosure into which the charged mist is directed and through which the article to be sterilized or disinfected is conveyed, and thereby including means for exposing the article to the charged mist for disinfection or sterilizing of the article;

means for generating a pulsating magnetic filed to which the article in the enclosure is exposed; and means for conditioning and directing air to remove the mist from the article.

15. The apparatus in accordance with claim 14, wherein the liquid is means for mixing comprises a gas injector and aspiral shaped mixing chamber.

16. The apparatus in accordance with claim 14, wherein the mixing means comprises a mixing tank.

17. The apparatus in accordance with claim 16, additionally comprising control means comprising means for controlling intake of a gas having a redox potential which is to be mixed with the treated water in the mixing tank, and a magnetic valve for controlling intake of treated water to the tank, and including a level gauge.

18. The apparatus in accordance with claim 17, wherein the control means and liquid gauge are mounted together with a liquid intake pipe on an immersion device constructed and arranged for movement into and out of the mixing tank.

* * * * *